United States Patent
Inagawa et al.

(10) Patent No.: US 8,089,792 B2
(45) Date of Patent: Jan. 3, 2012

(54) CYCLOCONVERTER GENERATOR

(75) Inventors: Toshinori Inagawa, Wako (JP);
Shinsaku Nakayama, Wako (JP);
Yoshinori Masubuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 429 days.

(21) Appl. No.: 12/436,367

(22) Filed: May 6, 2009

(65) Prior Publication Data

US 2009/0279338 A1 Nov. 12, 2009

(30) Foreign Application Priority Data

May 9, 2008 (JP) ................. 2008-123325

(51) Int. Cl.
*H02M 7/521* (2006.01)
(52) U.S. Cl. ....................................... 363/136
(58) Field of Classification Search .............. 363/37, 363/136, 138, 137, 160
See application file for complete search history.

(56) References Cited

U.S. PATENT DOCUMENTS 4,056,766 A * 11/1977 Zander ............................ 363/37
4,468,725 A   8/1984 Venturini

FOREIGN PATENT DOCUMENTS

| EP | 1 126 589 A2 | 8/2001 |
| JP | 11-136998 | 5/1999 |
| JP | 3447934 B2 | 7/2003 |

OTHER PUBLICATIONS

Peter Nielson et al., "New Protection Issues of a Matrix Converter: Design Considerations for Adjustable-Speed Drives", IEEE Transactions on Industry Applications, Sep. 12, 1999, vol. 35, No. 5, Piscataway, NJ.

* cited by examiner

*Primary Examiner* — Shawn Riley
(74) *Attorney, Agent, or Firm* — Arent Fox LLP (57) ABSTRACT

In a cycloconverter generator, there are provided, q number of power circuits that supply rectified DC power of a DC power supply unit as operating power to the p(p>q) number of thyristors, and r(p>r) number of thyristor drive circuits that are connected to the q number of the power circuits and drive the p number of the thyristors, wherein the r number of the thyristors drive circuits are individually used to drive in common ones among the p number of the thyristors whose operation is unaffected even if driven at the same timing such that the number r of the drive circuits is made smaller than the number p of the thyristors, thereby enabling to simplify circuit configuration.

5 Claims, 11 Drawing Sheets

CYCLOCONVERTER GENERATOR

BACKGROUND OF THE INVENTION

1. Field of the Invention

This invention relates to a cycloconverter generator, namely a generator that converts AC power of a given frequency to another frequency for output.

2. Description of the Related Art

The cycloconverter generator that produces an output by converting AC power of a given frequency to another frequency is well known. A description of the cycloconverter generator technology can be found, for example, in Japanese Patent No. 3447934. The cycloconverter generator described in this reference is equipped with twelve thyristors bridge-connected in antiparallel connection to three-phase output windings in the positive and negative directions and generates single-phase alternating current of a desired frequency by turning on the thyristors at variable timing (width or angle) every half-period of the desired alternating current frequency.

SUMMARY OF THE INVENTION

This type of cycloconverter generator has a complicated circuit configuration because each of the twelve thyristors is generally driven independently by a separately provided power circuit and drive circuit.

An object of this invention is therefore to overcome this drawback by providing a cycloconverter generator having a simpler circuit configuration with a reduced number of thyristor power circuits and drive circuits.

In order to achieve the first objects, this invention provides a cycloconverter generator equipped with a magneto having three-phase output windings, single-phase output windings facing the permanent magnets to produce phase signals each indicative of a phase of the output of the magneto, a bridge circuit comprising p number of thyristors bridge-connected in antiparallel connection to the three-phase output windings to constitute a cycloconverter, and a bridge drive circuit that generates single-phase AC power to be supplied to a load by turning on the p number of the thyristors of the bridge circuit at variable timing every half-period of a desired AC power frequency based on the phase signal; comprising: a single DC power supply unit that is connected to the single-phase output winding and rectifies AC power outputted by the single-phase output winding to DC power; q number of power circuits that are connected to the DC power supply unit and supply the rectified DC power as operating power to the p (p>q) number of the thyristors; and r (p>r) number of thyristor drive circuits that are connected to the q number of the power circuits and drive the p number of the thyristors, wherein the r number of the thyristors drive circuits are individually used to drive in common ones among the p number of the thyristors whose operation is unaffected even if driven at the same timing such that the number r of the drive circuits is made smaller than the number p of the thyristors.

BRIEF DESCRIPTION OF THE DRAWINGS

The above and other objects and advantages of the invention will be more apparent from the following description and drawings in which:

FIG. 14 is a circuit diagram showing another example of the drive circuit of the thyristors shown in FIG. 9 and the like; and FIG. 15 is a circuit diagram similarly showing still another example of the drive circuit of the thyristors shown in FIG. 9 and the like.

DETAILED DESCRIPTION OF THE PREFERRED EMBODIMENT

Figure 1:
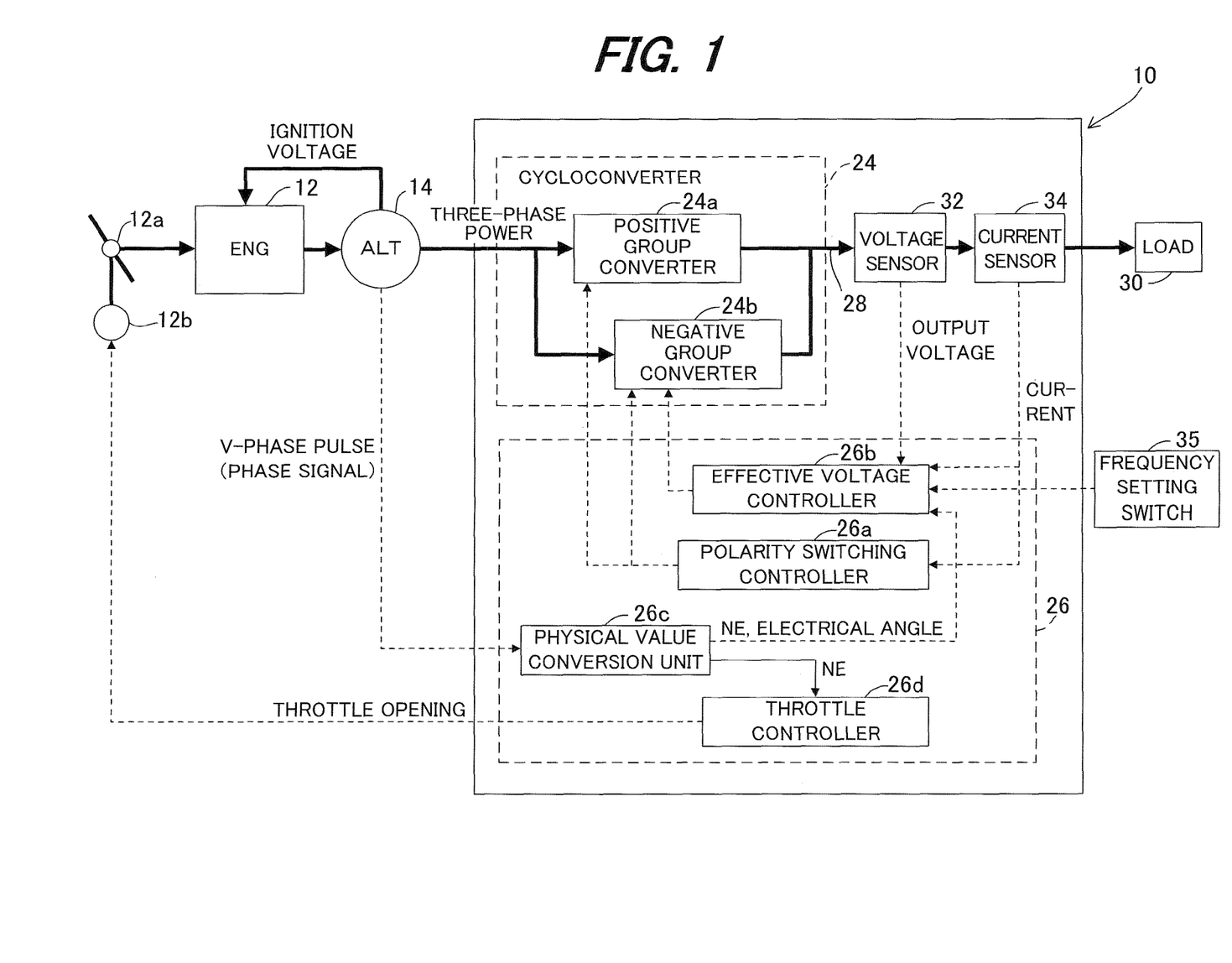
FIG. 1 is a block diagram showing the overall configuration of a cycloconverter generator according to this embodiment of the present invention.

FIG. 1 is a block diagram showing the overall configuration of the cycloconverter generator according to the present invention.

Reference numeral 10 is assigned to the cycloconverter generator in FIG. 1. The generator 10 is equipped with an internal combustion engine 12 (named ENG in the drawing). It has rated outputs of AC 100 V-2.3 kVA and DC 12 V-10 A. The engine 12 is an air-cooled, spark ignition unit whose throttle valve 12a is moved by an actuator 12b comprising a stepper motor or the like. It is started using a recoil starter (not shown).

The generator 10 is equipped with a magneto 14 (named ALT in FIG. 1) that is driven by the engine 12.

Figure 2:
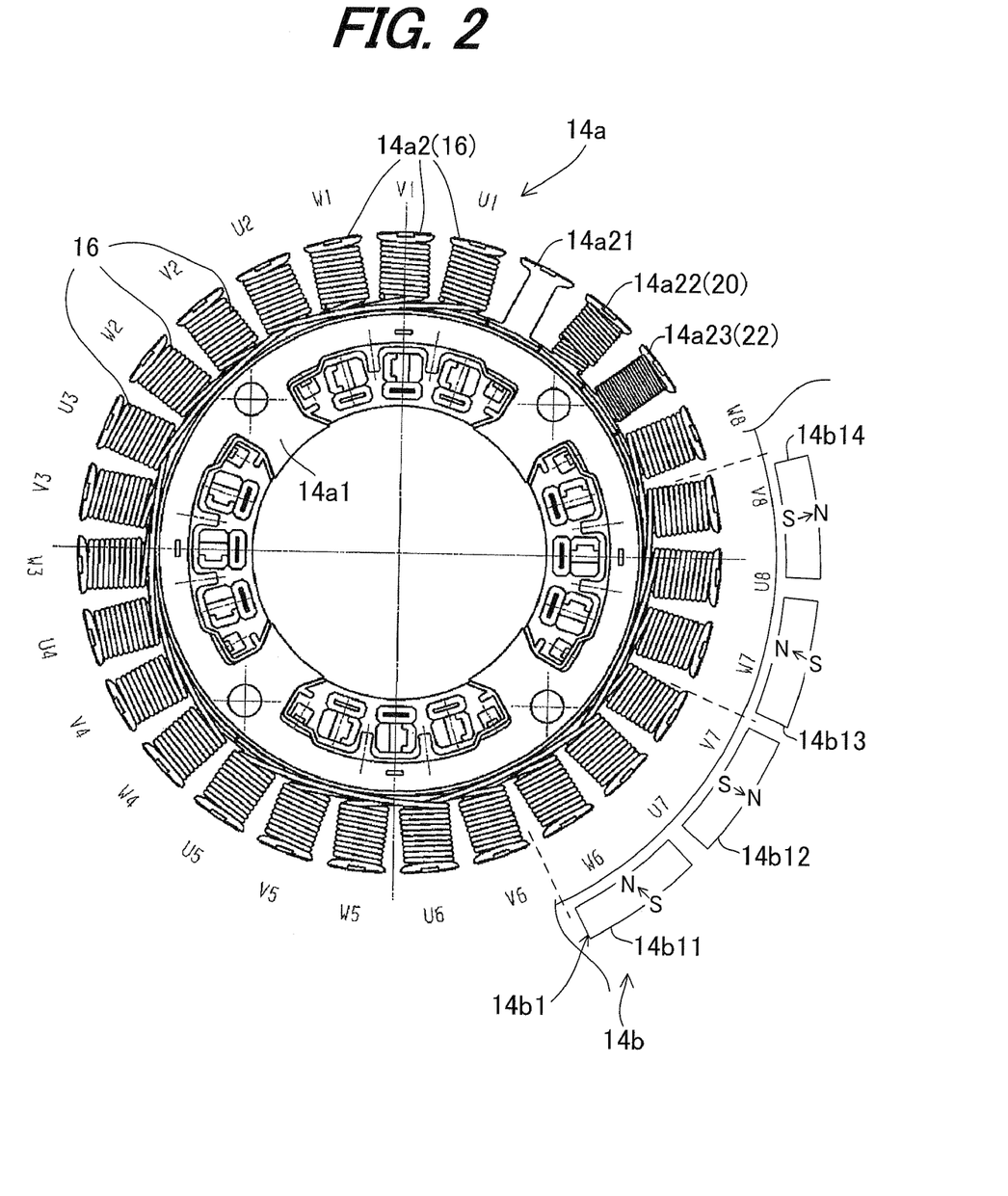
FIG. 2 is a plan view of a stator constituting a magneto shown in FIG. 1.

FIG. 2 is a plan view of a stator 14a of the magneto 14.

The stator 14a is equipped with a stator core 14a1 fastened near the cylinder head of the engine 12. As illustrated, twenty-seven teeth 14a2 are formed to project radially from the stator core 14a1. Twenty-four of the teeth 14a2 are wound with coils Un, Vn and Wn (n: 1 to 8) to form three-phase (U, V and W) output windings (main windings) 16.

Among the three teeth 14a21, 14a22 and 14a23 located between coils U1 and W8, the tooth 14a21 corresponding to W phase is not wound with a coil, while the tooth 14a22 corresponding to V phase and the tooth 14a23 corresponding to U phase are wound with coils to form single-phase output windings 20 and 22.

A rotor 14b is installed around the stator 14a. Nine pairs of permanent magnets 14b1 (18 magnets) are attached inside the rotor 14b at positions opposite the aforesaid coils and with their radially oriented polarities reversed alternately as illustrated. Two permanent magnets 14b1 (e.g., 14b11 and 14b12) form one pair, and one pair of the permanent magnets 14b1 is installed per three teeth 14a2. The rotor 14b also serves as the flywheel of the engine 12.

When the permanent magnets 14b1 of the rotor 14b surrounding the stator 14a rotate, three-phase alternating current is outputted from the three-phase output windings 16 and single-phase alternating current is outputted from the single-phase output winding 20, i.e., V-phase pulses (phase signal) indicating the phase of the output of the magneto 14, more exactly the output of the output windings 16, are outputted from the single-phase output winding 20. As further explained below, the output of the single-phase output winding 20 is rectified and used as a power circuit. Single-phase alternating current is also outputted from the output winding 22.

Returning to the explanation of FIG. 1, the three-phase alternating current generated by the magneto 14 is inputted to a bridge circuit 24 of the cycloconverter.

Figure 3:
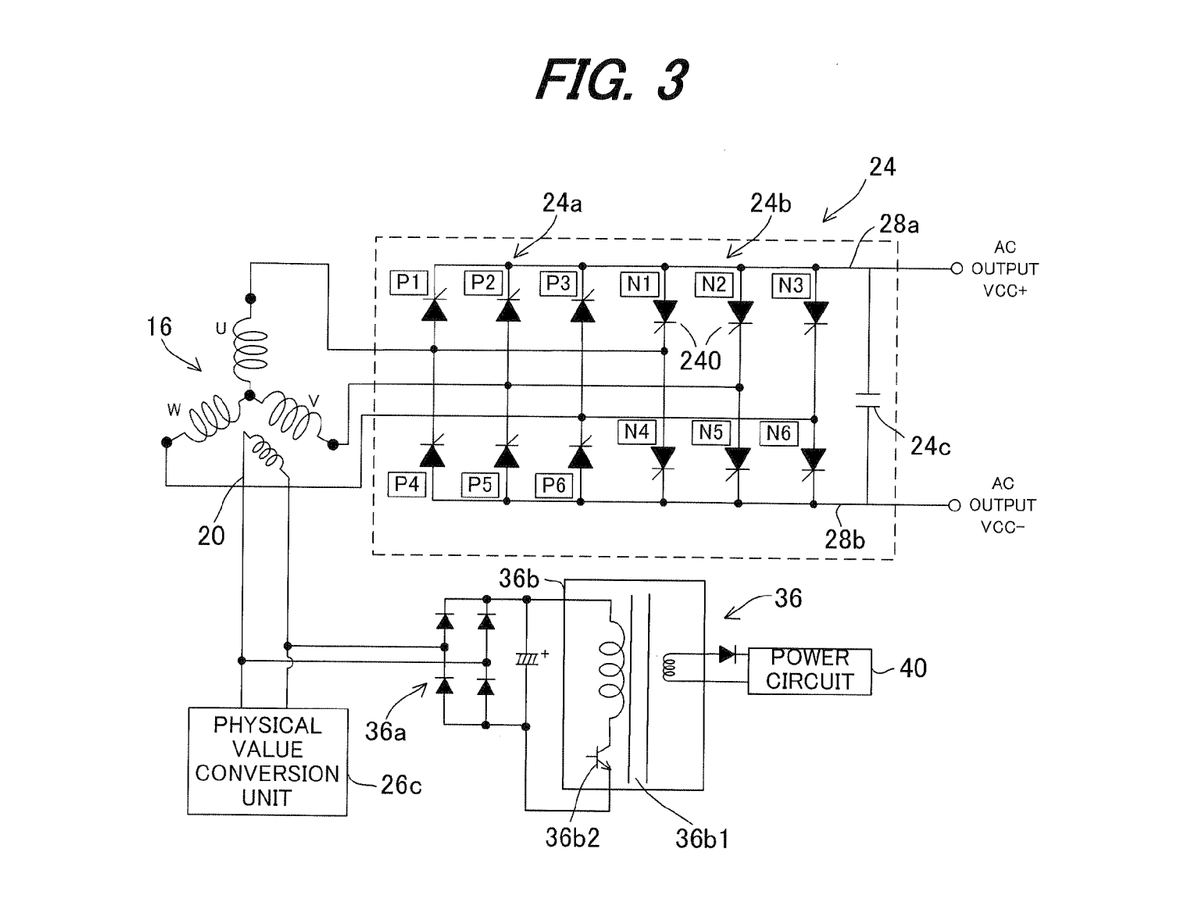
FIG. 3 is a block diagram showing the structure of a SCR (thyristor) converter shown in FIG. 1 in detail.

FIG. 3 is a block diagram showing the structure of the bridge circuit 24 of the cycloconverter in detail. As illustrated, the bridge circuit 24 comprises a positive group converter 24a, a negative group converter 24b and a smoothing capacitor 24c.

The positive group converter 24a comprises a total of six thyristors (SCRs) Pn (n: 1 to 6) arranged in three parallel connected pairs with their cathodes facing the positive side. The negative group converter 24b comprises the same number of thyristors (SCRs) Nn (n: 1 to 6) arranged in three parallel connected pairs with their cathodes facing the negative side. In the following, the thyristors (SCRs) are referred to collectively by the reference numeral 240.

Thus the bridge circuit 24 is structured as a bridge circuit comprising p number (p: 12) of thyristors bridge-connected in antiparallel connection to the three-phase output windings 16 in the positive and negative sides to constitute a cycloconverter.

The output terminals of the three-phase output windings 16 are connected to midpoints of the paired thyristors 240. In other words, in the bridge circuit 24, the positive group converter 24a and negative group converter 24b are bridge-connected in antiparallel connection to the three-phase output windings 16.

Returning to the explanation of FIG. 1, the bridge circuit 24 is connected to an Electronic Control Unit (ECU) 26.

The ECU 26 is equipped with a polarity switching controller 26a, an effective voltage controller 26b, a physical value conversion unit 26c, and a throttle controller 26d. The ECU 26 includes a microcomputer equipped with a CPU, ROM, RAM, I/O ports and the like, and the aforesaid polarity switching controller 26a, etc., are operations of the CPU expressed functionally.

As explained further later, the polarity switching controller 26a of the ECU 26 selects (switches to) the one of the positive group converter 24a and negative group converter 24b of the bridge circuit 24 whose thyristors are to be turned on, and the effective voltage controller 26b controls their turning timing (angle or width). The three-phase alternating current inputted in this manner is converted to single-phase alternating current that is supplied to a load 30 through a power feed line 28.

As illustrated, the V-phase pulses (phase signal) outputted from the output winding 20 are sent through the physical value conversion unit 26c of the ECU 26 to the polarity switching controller 26a and effective voltage controller 26b. The physical value conversion unit 26c counts the V-phase pulses to detect the engine speed NE. The output of the output winding 22 is wave-formed and supplied as ignition voltage to an ignition coil, etc., of an ignition system (not shown) of the engine 12.

The engine speed NE detected by the physical value conversion unit 26c is sent to the throttle controller 26d. The throttle controller 26d uses a self-tuning regulator to regulate the operation of the actuator 12b so as to control the opening/closing of the throttle valve 12a as required to converge the detected engine speed NE to the desired engine speed NED. The details of this control will not be explained here because they are not directly related to the purport of the invention.

The detected engine speed NE and the phase signal are sent to the effective voltage controller 26b. A voltage sensor 32 and a current sensor 34 are installed in the power feed line 28 and produce outputs or signals proportional to the voltage and current of the power feed line 28. The outputs of the voltage sensor 32 and current sensor 34 are sent to the polarity switching controller 26a and effective voltage controller 26b.

A frequency setting switch (SW) 35 that the operator can use to set or input the desired frequency (60 Hz or 50 Hz according to the commercial power system to be emulated) is provided on the control panel (not shown) of the cycloconverter generator 10 or at some other appropriate location readily accessible to the operator.

The operation of the polarity switching controller 26a and effective voltage controller 26b will next be explained regarding the case of converting the three-phase alternating current to single-phase alternating current of the desired frequency of 60 Hz (or 50 Hz) of a commercial power system.

Figure 4:
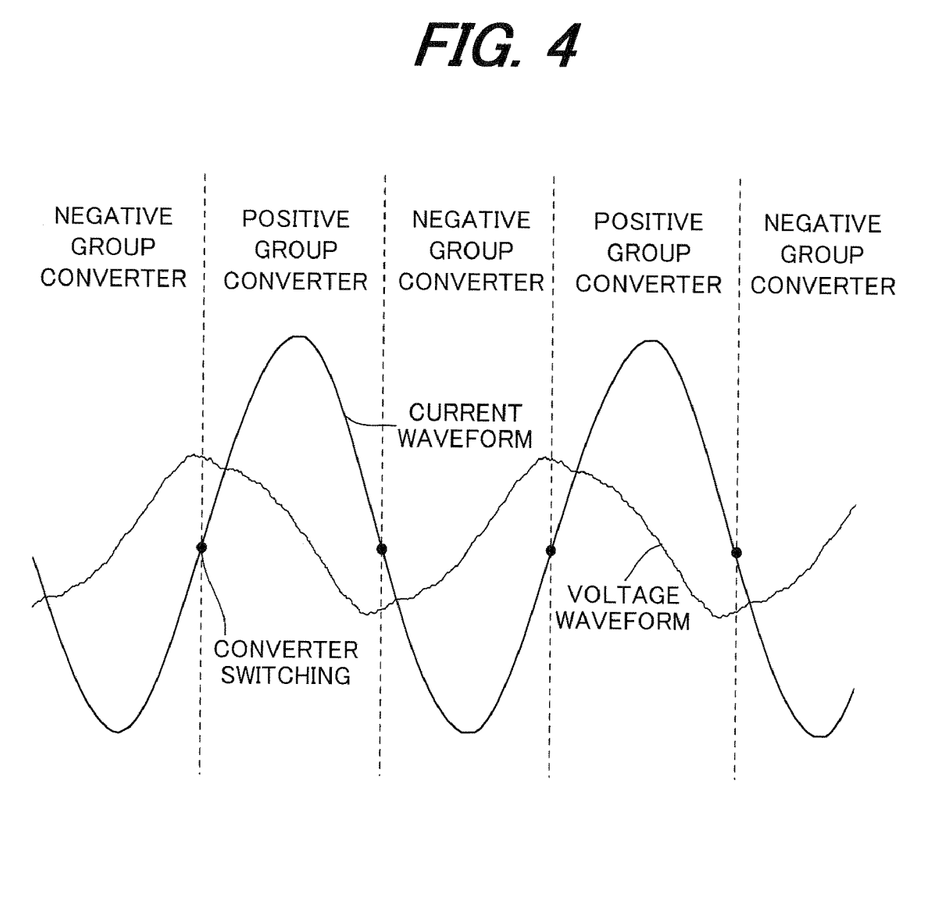
FIG. 4 is a time chart showing the operation of switching (selecting) the SCR converter when converting to alternating current by a polarity switching controller of an electronic control unit (ECU) shown in FIG. 1.

In this case, as shown in FIG. 4, the polarity switching controller 26a determines which between the positive group converter 24a and negative group converter 24b is to be turned on based on the inclination of alternating current detected by the current sensor 34.

Specifically, the polarity switching controller 26a determines that the positive group converter 24a is to be turned on when the detected current exceeds the 0 level on the positive side and that the negative group converter 24b is to be turned on when it exceeds the 0 level on the negative side.

Figure 5:
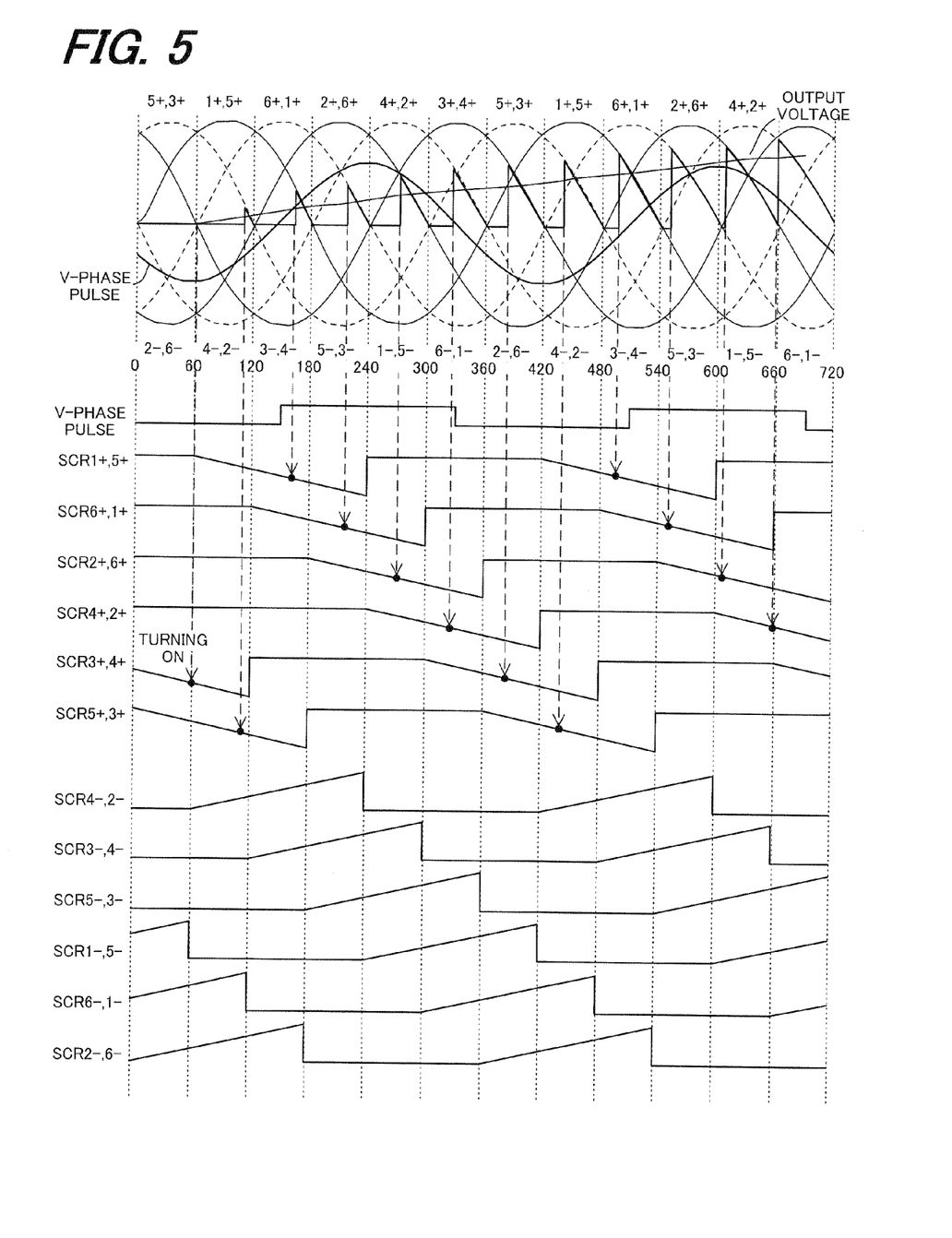
FIG. 5 is a time chart similarly showing the operation of turning-on the SCR converter by an effective voltage controller of the ECU shown in FIG. 1 when converting to alternating current.
Figure 6:
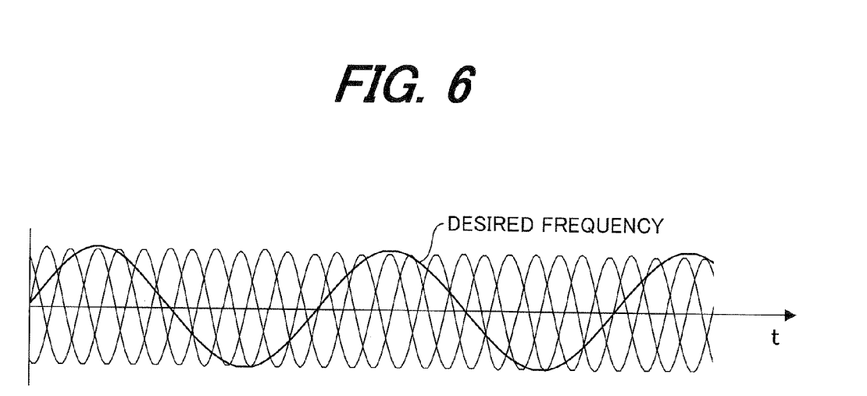
FIG. 6 is a time chart of a desired frequency waveform used in the turning-on operation of the SCR converter shown in FIG. 5.

Based on the aforesaid phase signal and reference sawtooth waves, like those shown in FIG. 5, generated for respective ones of the 12 thyristors 240 (designated SCRn+, n− in the drawing) of the positive group converter 24a and negative group converter 24b, and based on the a desired frequency waveform, like that shown in FIG. 6, set by the operator using the frequency setting switch SW35 and the results of comparisons performed by comparators (not shown) installed in association with respective ones of the twelve thyristors 240, the effective voltage controller 26b turns on the thyristors at the timings indicated by arrows in the drawing, thereby controlling the effective output voltage to the desired voltage. In FIG. 5, the voltages applied between UV, VW and WU are represented by solid curves and the voltages reversely applied between VU, WV, UW are represented by broken curves.

As shown in FIG. 3, the generated single-phase alternating current controlled to the desired effective voltage by the effective voltage controller 26b is smoothed by the smoothing capacitor 24c and supplied to the load 30 through the power feed line 28, more exactly power feed lines 28a and 28b. Thus, the cycloconverter is composed of the bridge circuit 24 and ECU 26.

The power circuits of the thyristors 240 will now be explained.

As shown in FIG. 3, the single-phase output winding 20 is connected to the physical value conversion unit 26c of the ECU 26, and is also connected to a single DC power supply unit, more exactly to a regulated DC power supply unit 36. The regulated DC power supply unit 36 is equipped with a rectifier circuit 36a and a flyback converter, more specifically a Ringing Choke Converter (RCC) 36b.

The rectifier circuit 36a is a conventional single-phase, full-wave rectifier circuit comprising four bridge-connected diodes and a smoothing capacitor. The output of the single-phase output winding 20 is rectified by the four diodes, whereafter ripples are removed from the rectified output by the smoothing capacitor.

The RCC 36b is equipped with a transformer 36b1. Power is stored in the transformer 36b1 when a primary-side transistor 36b2 is turned on (conductive) and the stored power is transferred to the secondary winding when the transistor 36b2 is turned off (nonconductive).

Power circuits (collectively designated by reference numeral 40) are connected to the secondary side of the RCC 36b. The power circuits 40 are circuits for supplying rectified 5 V DC power as operating power to the twelve thyristors.

Figure 7:
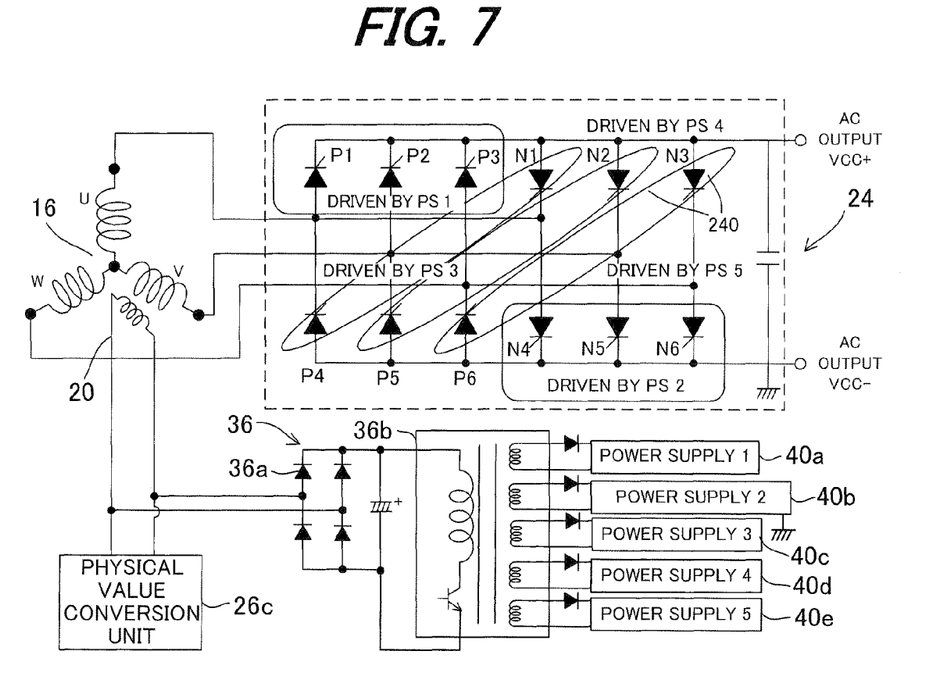
FIG. 7 is a block diagram similar to FIG. 3, but showing the SCR converter, which shows power circuits and the like of the FIG. 3 configuration in greater detail.

FIG. 7 is a block diagram of the bridge circuit 24 similar to that of FIG. 3, which shows the power circuits 40 and the like of the FIG. 3 configuration in greater detail. As shown by the detailed diagram of FIG. 7, the power circuits 40 include power circuits 40a, 40b, 40c, 40d, and 40e, which constitute power supplies 1, 2, 3, 4 and 5.

Figure 8:
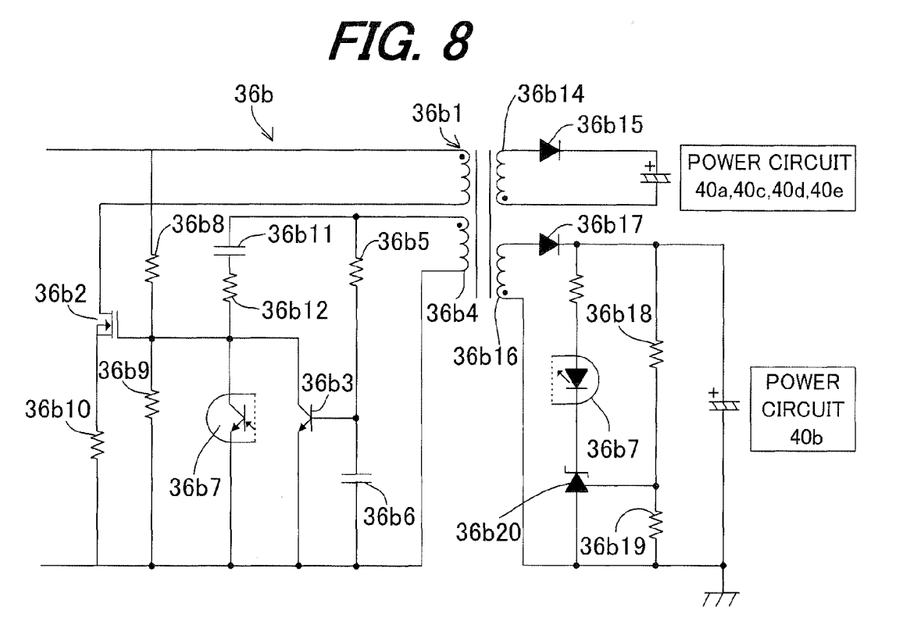
FIG. 8 is a circuit diagram concretely illustrating the configuration of a regulated DC power supply unit (RCC) shown in FIG. 7.

FIG. 8 is a circuit diagram concretely illustrating the configuration of the RCC 36b shown in FIG. 7. As illustrated, the RCC 36b is equipped with the FET 36b2 connected to the primary-side main coil of the transformer 36b1. The gate of the FET 36b2 is connected to the emitter of a transistor 36b3. The FET 36b2 is turned on when the transistor 36b3 is turned on at a frequency determined by the time constant of an RC circuit that comprises a resistor 36b5 and a capacitor 36b6 and is powered by voltage from a sub-coil 36b4.

The source of the FET 36b2 is connected to a photocoupler 36b7. The photocoupler 36b7 is turned on in response to lighting of a photodiode on the secondary side when the secondary side voltage reaches a reference voltage, thereby turning the FET 36b2 off. The reference symbols 36b8 and 36b9 designate gate resistors for initially driving the FET 36b2, and reference symbol 36b10 designates a resistor for current detection. The capacitor 36b11 and resistor 36b12 are for phase compensation.

The output of the secondary-side main coil 36b14 of the RCC 36b is connected to the power circuits 40a, 40c, 40d, and 40e through a rectifier diode 36b15. The output of the secondary-side sub-coil 36b16 is connected to the power circuit 40b through a rectifier diode 36b17.

The resistors 36b18 and 36b19 are components of a secondary-side voltage detector and the zener diode 36b20 is a component of a driver for driving the photodiode of the photocoupler 36b7 in response to the aforesaid reference voltage. The capacitors provided in the power circuits 40 are for smoothing.

Figure 9:
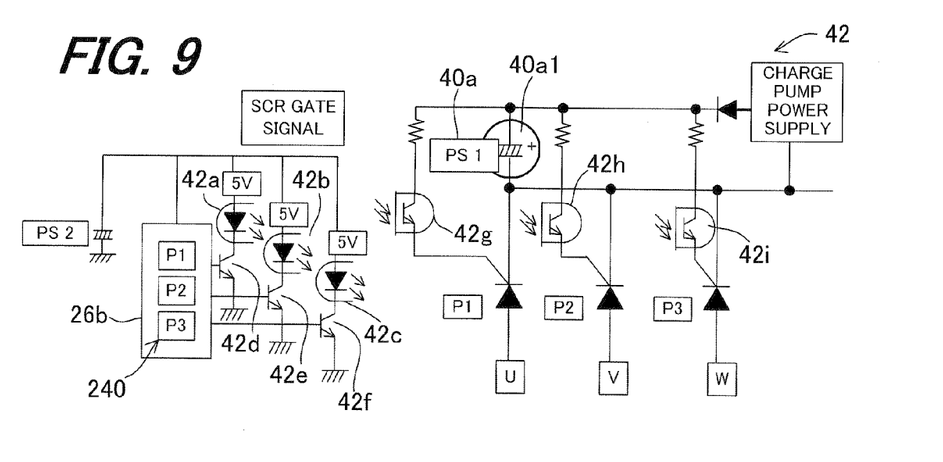
FIG. 9 is a detailed circuit diagram showing the power circuit of FIG. 7 and a drive circuit of thyristors connected thereto.

FIG. 9 is a detailed circuit diagram showing the power circuit 40a of FIG. 7 and the thyristors (SCRs) 240 connected thereto, more specifically the drive circuits of the thyristors P1, P2 and P3.

As illustrated, the drive circuits 42 of the thyristors 240 comprise three photodiodes 42a, 42b and 42c, three transistors 42d, 42e and 42f whose emitters are connected to the photodiodes 42a, 42b and 42c and whose collectors are grounded, and three phototransistors 42g, 42h and 42i optically, i.e., insulatively, connected to the three photodiodes 42a, 42b and 42c to constitute photocouplers. The photodiodes 42a, 42b and 42c are connected to the power supply 2 (power circuit 40b) to be supplied with 5 V operating power. The bases of the transistors 42d, 42e and 42f are connected to the effective voltage controller 26b of the ECU 26.

The collectors of the phototransistors 42g, 42h and 42i are connected through resistors to the positive side of a capacitor 40a1 of the power supply 1 (power circuit 40a) and the emitters thereof are connected to the gates of P1, P2 and P3 of the thyristors 240.

In this configuration, the transistors 42d, 42e and 42f are turned on when the effective voltage controller 26b applies H (high level) signals to their bases, thereby turning on the associated photodiodes 42a, 42b and 42c. As a result, the associated phototransistors 42g, 42h and 42i are turned on and the current passing from the power supply 1 (power circuit 40a) is sent to the gates of P1, P2 and P3 of the thyristors 240, thereby driving them.

Figure 10:
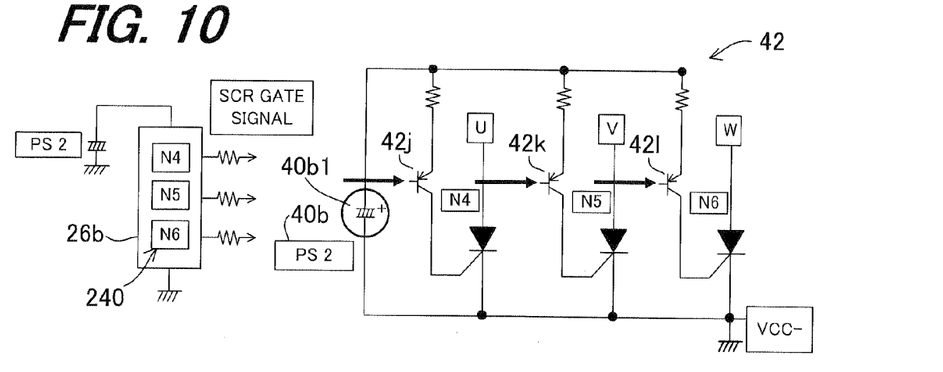
FIG. 10 is a detailed circuit diagram similarly showing the power circuit of FIG. 7 and the drive circuit of the thyristors connected thereto.

FIG. 10 is a detailed circuit diagram showing the power supply 2 (power circuit 40b) of FIG. 7 and the thyristors 240 connected thereto, more specifically the drive circuits 42 of the thyristors N4, N5 and N6.

As illustrated, the drive circuits 42 of the thyristors 240 comprise three transistors 42j, 42k and 42l. The collectors of the transistors 42j, 42k and 42l are connected through resistors to the positive side of a capacitor 40b1 of the power supply 2 (power circuit 40b) and the emitters thereof are connected to the gates of N4, N5 and N6 of the thyristors 240.

The bases of the transistors 42j, 42k and 42l are connected through resistors to the effective voltage controller 26b of the ECU 26. The negative side of the capacitor 40b1 is grounded.

In this configuration, the transistors 42j, 42k and 42l are turned on when the effective voltage controller 26b applies L (low level) signals to their bases. As a result, the current passing from the power supply 2 (power circuit 40b) is sent to the gates of N4, N5 and N6 of the thyristors 240, thereby driving them.

Figure 11:
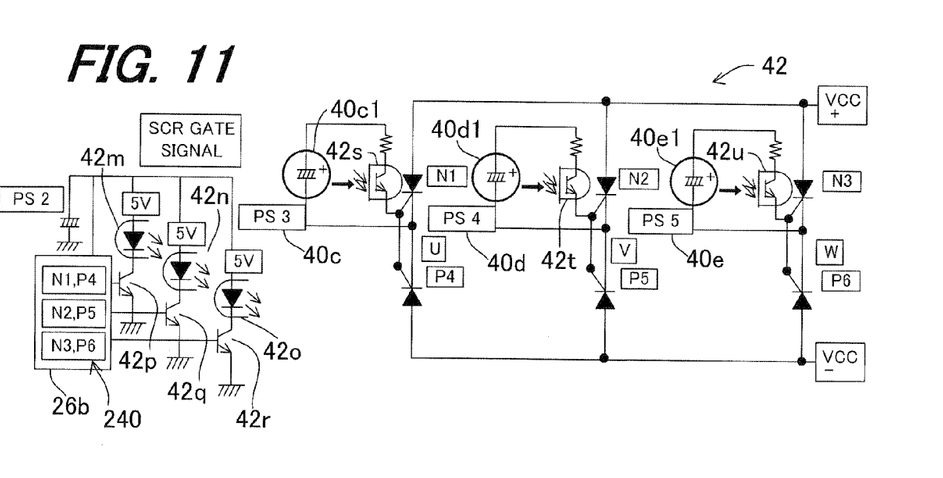
FIG. 11 is a detailed circuit diagram similarly showing the power circuit of FIG. 7 and the drive circuit of the thyristors connected thereto.

FIG. 11 is a detailed circuit diagram showing the power supplies 3, 4 and 5 (power circuits 40c, 40d and 40e) of FIG. 7 and the thyristors 240 connected thereto, more specifically the drive circuits of the thyristors N1, N2, N3, P4, P5 and P6.

As illustrated, the drive circuits 42 of the thyristors 240 comprise three photodiodes 42m, 42n and 42o, three transistors 42p, 42q and 42r whose emitters are connected to the photodiodes 42m, 42n and 42o and whose collectors are grounded, and three phototransistors 42s, 42t and 42u optically, i.e., insulatively, connected to the three photodiodes 42m, 42n and 42o to constitute photocouplers.

The photodiodes 42m, 42n and 42o are connected to the power supply 2 (power circuit 40b) to be supplied with 5 V operating power. The bases of the transistors 42p, 42q and 42r are connected to the effective voltage controller 26b of the ECU 26.

The collectors of the phototransistors 42s, 42t and 42u are connected through resistors to the positive sides of capacitors 40c1, 40d1 and 40e1 of the power circuits 40c, 40d and 40e and the emitters thereof are connected to the gates of N1 and P4, N2 and P5, and N3 and P6 of the thyristors 240. Thus, as regards the power supplies 3, 4 and 5 (power circuits 40c, 40d and 40e), two thyristors make one drive circuit.

Similarly to in the configuration of FIG. 9, the transistors 42p, 42q and 42r are turned on when the effective voltage controller 26b applies H (high level) signals to their bases, thereby turning on the associated photodiodes 42m, 42n and 42o. As a result, the associated phototransistors 42s, 42t and 42u are turned on and the currents passing from the power supplies 3, 4 and 5 are sent to the gates of N1 and P4, N2 and P5, and N3 and P6 of the thyristors 240, thereby driving them.

The feature that characterizes the cycloconverter generator according to this embodiment is that, as shown starting from FIG. 7, it is equipped with the single regulated DC power supply unit 36 connected to the single-phase output winding 20 to rectify the AC power output thereof to DC power, and the power circuits 40 for supplying the twelve thyristors 240 with the rectified DC power as operating power are connected to the regulated DC power supply unit 36, thereby reducing the number of power circuits 40 to five and reducing the number of drive circuits 42 connected to the power circuits 40 for driving the twelve thyristors to nine.

Figure 12:
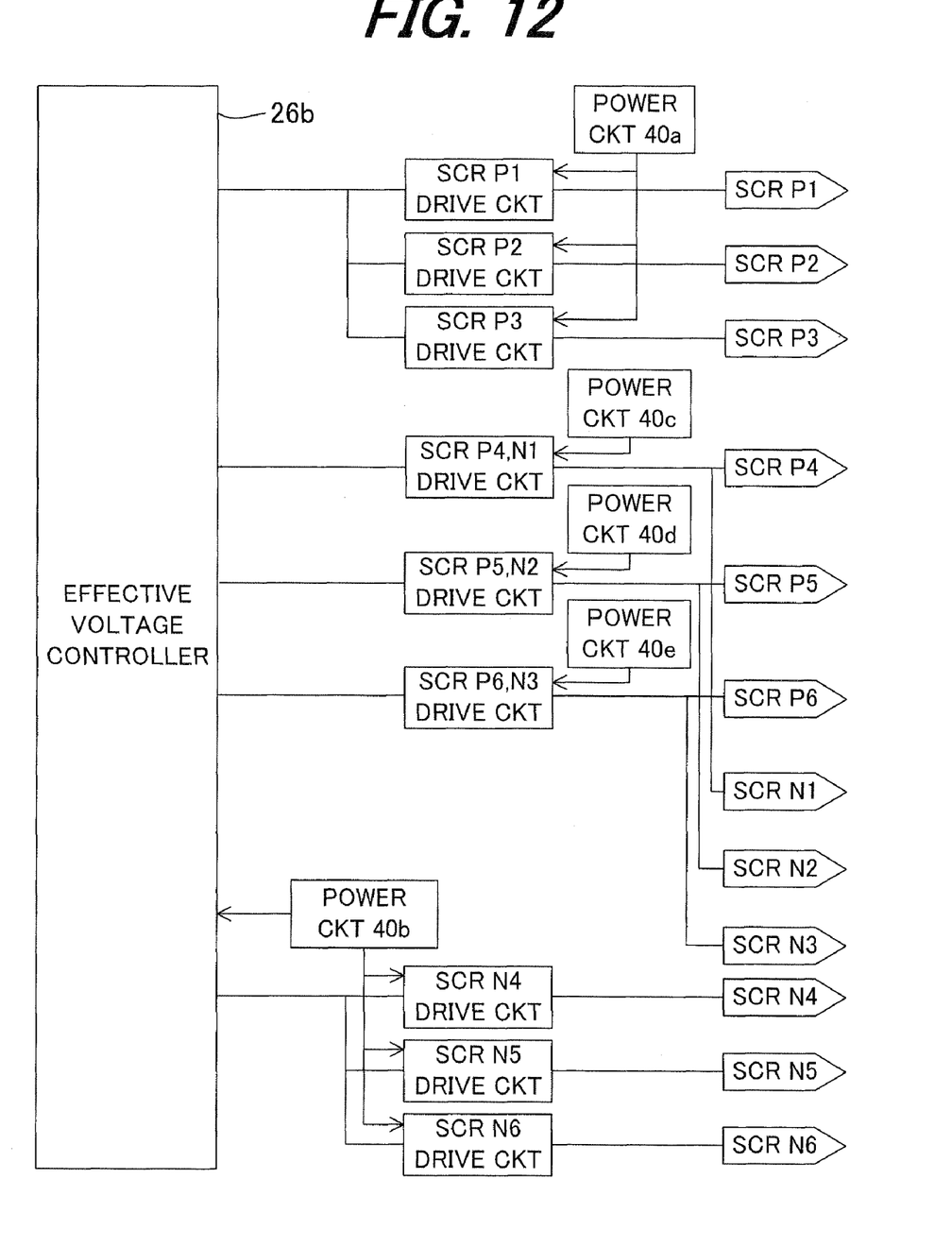
FIG. 12 is an explanatory diagram showing the layout of the power circuits and the like in the cycloconverter generator according to this embodiment.
Figure 13:
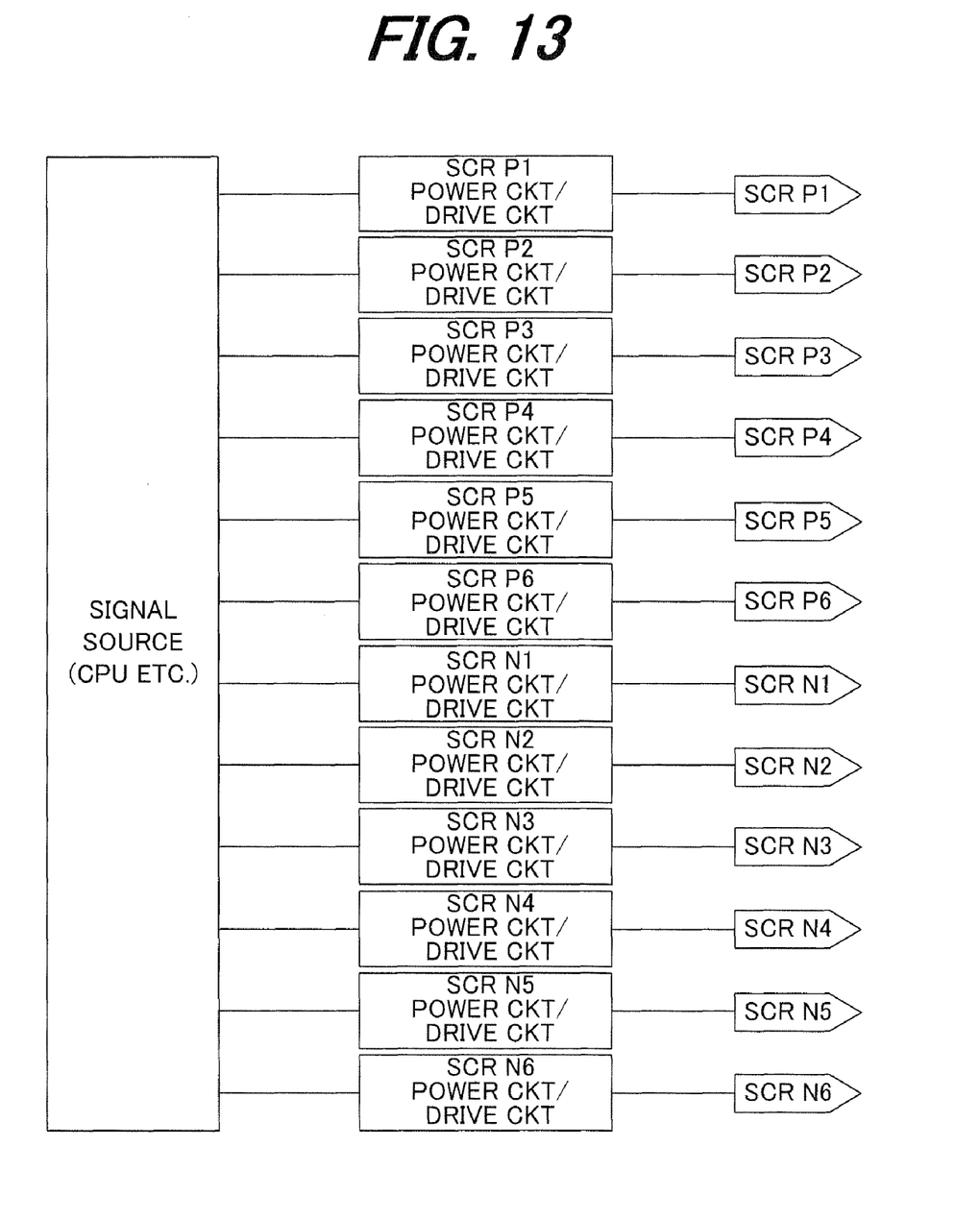
FIG. 13 is an explanatory diagram similar to FIG. 12, but showing a prior art cycloconverter generator.

FIG. 12 is an explanatory diagram showing the layout of the power circuits and the like in the cycloconverter generator according to this embodiment, and FIG. 13 is a corresponding diagram for a prior art cycloconverter generator. As is clear from a comparison of FIGS. 12 and 13, the prior art configuration requires the same number of power circuits and drive circuits as the number of thyristors, namely twelve, while, in contrast, this embodiment can reduce the number of power circuits 40 and drive circuits 42 required by seven and three, respectively.

The reduction in the number of drive circuits 42 will be explained. As shown in FIG. 5, the thyristors 240 are driven in pairs, one each on the positive and negative sides, at 30-degree phase (electrical angle) intervals. For example, the two thyristors P5 and N2 are driven in the phase angle range of 0 to 30 degrees, the two thyristors P3 and N6 are driven in the phase angle range of 30 to 60 degrees, the two thyristors P1 and N4 are driven in the phase angle range of 60 to 90 degrees, and the two thyristors P5 and N2 are driven in the phase angle range of 90 to 120 degrees.

The term "driven" as used with respect to a thyristor 240 here does not mean that the thyristor is "turned on" but that its gate is supplied with current. To turn on the thyristor 240 it is necessary both for its gate to be conductive and for the input from the output terminal of the corresponding phase of the output windings 16 to be present.

The input is a sinewave in this case, so that insofar as the zero cross-point is synchronized with the phase, the input waveform is limited to either positive or negative at phase angle of 30 degrees. Therefore, even if positive side and negative side thyristors 240 are driven simultaneously, i.e., even if they are driven together at a phase angle of 30 degrees, one or the other of the positive side and negative side thyristors is not turned on and produces no output. In other words, the timing at which the positive side and negative side thyristors 240 are driven can be made the same without affecting the operation.

More specifically, even if the two thyristors P5 and N2, or the two thyristors P3 and N6, or the two thyristors P1 and N4 in FIG. 7 are driven simultaneously, neither of the two driven thyristors affects the operation of the other. The inventors accomplished this invention by focusing on this point. As shown in FIG. 7, those of the thyristors 240 which have no effect on one another's operation when operated simultaneously are grouped and assigned to common drive circuits 42. As a result, the number of drive circuits 42 is reduced to nine, i.e., to fewer than the number of thyristors 240 (twelve).

This embodiment provides a cycloconverter generator 10 equipped with:

the five (q) power circuits 40 that are connected to the single regulated DC power supply unit 36 for rectifying the AC power outputted by the single-phase output winding 20 to DC power and that supply the rectified DC power as operating power to the twelve (p, p>q) thyristors; and the nine (r, p>r) drive circuits 42 that are connected to the five power circuits and drive the twelve thyristors 240, wherein the nine drive circuits are individually used to drive in common ones among the twelve thyristors whose operation is unaffected even if driven at the same timing, thereby making the number r of the drive circuits 42 smaller than the number p of the thyristors 240.

Owing to this arrangement, the regulated DC power supply unit 36 can, for example, be configured as the RCC 36b, which facilitates independent or dispersed establishment of the power circuits, with the result that number r of the drive circuits of the thyristors 240 can be made smaller than the number p of the thyristors.

Moreover, since the drive circuits 42 are individually used to drive in common ones among the p-number of thyristors whose operation is unaffected even if driven at the same timing, the number r of the drive circuits 42 can be made smaller than the number p of the thyristors, whereby the numbers q and r of the power circuits 40 and drive circuits 42 of the thyristors 240 can be reduced to enable circuit simplification, circuit miniaturization, parts count reduction, and cost reduction.

Further, the provision of the power circuits 40 of the thyristors 240 individually makes it possible to set the power supply voltage at the minimum sufficient for driving the gates of the thyristors 240, so that it becomes possible to build the drive circuits 42 using phototransistors and other low-voltage components.

Figure 14:
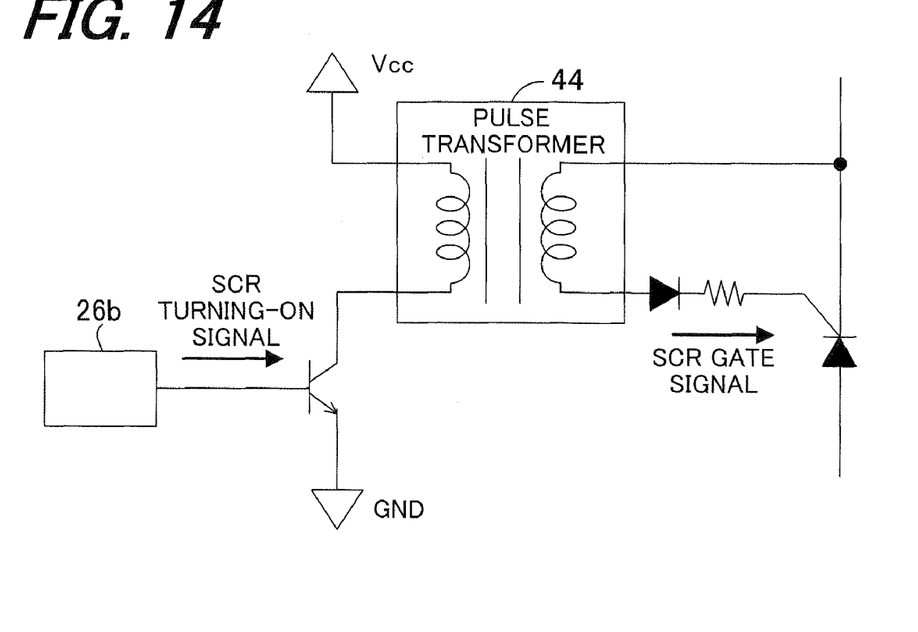
Figure 15:
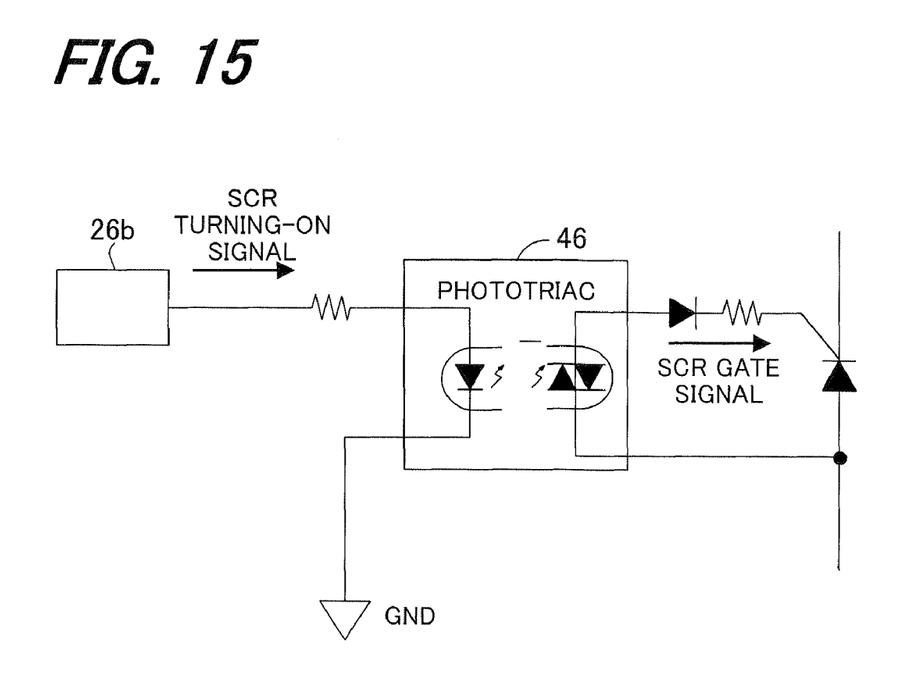

Although the drive circuits 42 are shown in FIG. 9, for example, to use photodiodes and phototransistors, this is not a limitation. Namely, it is possible instead to use a pulse transformer 44 as shown in FIG. 14 or a phototriac 46 as shown in FIG. 15.

As stated in the foregoing, this embodiment is configured to have a cycloconverter generator (10) equipped with a magneto (14) having three-phase output windings (16), single-phase output windings (20) facing the permanent magnets to produce phase signals each indicative of a phase of the output of the magneto, a bridge circuit (24) comprising p (i.e., twelve) number of thyristors (240) bridge-connected in antiparallel connection to the three-phase output windings to constitute a cycloconverter, and a bridge drive circuit (ECU 26, polarity switching controller 26a, effective voltage controller 26b) that generates single-phase AC power to be supplied to a load by turning on the p number of the thyristors of the bridge circuit at variable timing every half-period of a desired AC power frequency based on the phase signal; comprising: a single (regulated) DC power supply unit (36) that is connected to the single-phase output winding and rectifies AC power outputted by the single-phase output winding to DC power; q (e.g., five) number of power circuits (40) that are connected to the DC power supply unit and supply the rectified DC power as operating power to the p (p>q) number of the thyristors; and r (e.g., nine; p>r) number of thyristor drive circuits (42) that are connected to the q number of the power circuits and drive the p number of the thyristors, wherein the r number of the thyristors drive circuits are individually used to drive in common ones among the p number of the thyristors whose operation is unaffected even if driven at the same timing such that the number r of the drive circuits is made smaller than the number p of the thyristors.

In the generator, the single DC power supply unit (36) comprises a ringing choke converter.

In the generator, the p number of the thyristors (240) comprises a total of p/2 (e.g., six) number of positive group of thyristors (Pn) arranged in three parallel connected pairs with their cathodes facing the positive side and a total of p/2 (e.g., six) number of negative group of thyristors (Nn) arranged in three parallel connected pairs with their cathodes facing the negative side.

In the generator, the thyristors (240) whose operation is unaffected even if driven at the same timing are one of the positive group thyristors (Pn) and one of the negative group of thyristors (Nn).

In the generator, the thyristor drive circuit (42) comprises photodiodes and phototransistors.

It should be noted that, although the thyristor is used as a switching element, an FET or the like can be utilized instead.

It should also be noted that, although the phase signal (V-phase pulse) is detected from the output of the output winding 20 facing the rotor installed with the permanent magnets, it can be detected using a hall IC or a pickup coil.

Japanese Patent Application No. 2008-123325 filed on May 9, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A cycloconverter generator equipped with a magneto having three-phase output windings, single-phase output windings facing the permanent magnets to produce phase signals each indicative of a phase of the output of the magneto, a bridge circuit comprising p number of thyristors bridge-connected in antiparallel connection to the three-phase output windings to constitute a cycloconverter, and a bridge drive circuit that generates single-phase AC power to be supplied to a load by turning on the p number of the thyristors of the bridge circuit at variable timing every half-period of a desired AC power frequency based on the phase signal, comprising:
    a single DC power supply unit that is connected to the single-phase output winding and rectifies AC power outputted by the single-phase output winding to DC power;
    q number of power circuits that are connected to the DC power supply unit and supply the rectified DC power as operating power to the p(p>q) number of the thyristors; and
    r(p>r) number of thyristor drive circuits that are connected to the q number of the power circuits and drive the p number of the thyristors,
    wherein the r number of the thyristor drive circuits are individually used to drive in common ones among the p number of the thyristors whose operation is unaffected even if driven at the same timing such that the number r of the drive circuits is made smaller than the number p of the thyristors.

2. The generator according to claim 1, wherein the single DC power supply unit comprises a ringing choke converter.

3. The generator according to claim 1, wherein the p number of the thyristors comprise a total of p/2 number of positive group of thyristors arranged in three parallel connected pairs with their cathodes facing the positive side and a total of p/2 number of negative group of thyristors arranged in three parallel connected pairs with their cathodes facing the negative side.

4. The generator according to claim 3, wherein the thyristors whose operation is unaffected even if driven at the same timing are one of the positive group of thyristors and one of the negative group of thyristors.

5. The generator according to claim 1, wherein the thyristor drive circuit comprises photodiodes and phototransistors.

* * * * *